Feb. 2, 1971  L. ELSBETT  3,559,503
CONNECTING ROD FOR HIGH POWER PISTON ENGINES
Filed Jan. 27, 1969

INVENTOR
Ludwig Elsbett

United States Patent Office 3,559,503
Patented Feb. 2, 1971

3,559,503
CONNECTING ROD FOR HIGH POWER PISTON ENGINES
Ludwig Elsbett, Industriestrasse 14, Hilpoltstein, near Nuremberg, Germany
Filed Jan. 27, 1969, Ser. No. 794,140
Int. Cl. F16c 7/02
U.S. Cl. 74—579           4 Claims

ABSTRACT OF THE DISCLOSURE

The connecting rod of I-beam section has two struts across the web and connecting the flanges. The flanges extend in straight lines between the struts and the ends of the rod to form a lightweight rod which is sufficiently rigid.

Figure 1:
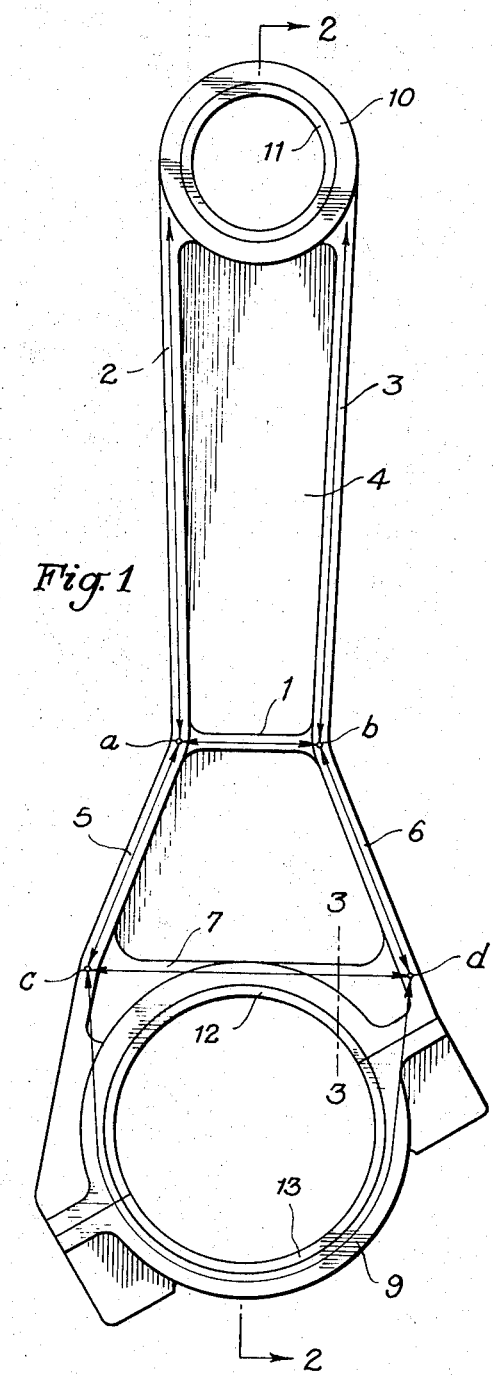

This invention relates to a connecting rod for high power reciprocating piston engines and is composed of an I-beam shaped shaft having a web lying in the plane of the movement of the rod and having bosses at each end for receiving the wrist pin and the crankshaft bearing together with a cap for the crankshaft boss and flanges extending between the crankshaft boss and the wrist pin boss and which emerge tangentially into the bosses.

However, in high speed engines, it is necessary to construct the two bosses so that they have as little weight as possible and at the same time maximum rigidity.

The objects of this invention is to produce a connecting rod in which flexing stresses are substantially avoided and which absorbs static forces to the connecting rod which is subject only to tension and compression forces.

In general these objects are obtained in that the web of the connecting rod is provided with two straight cross struts extending normal to the longitudinal axis of the connecting rod and joined to the flanges to form four junction points, and with the flanges extending in a straight line from the junction points to their respective bosses, namely, the wrist pin boss and the crankshaft boss.

Further features of this invention are that:

(a) the distance between the junction points nearest the wrist pin boss is equal to or smaller than the bore through the wrist pin boss; and
(b) the distance between the junction points nearest the crankshaft boss is at least equal to the bore through the crankshaft boss.

This ensures that the connecting rod will not be deformed or contracted under great compression pressures. Also, this prevents, during the maximum tension stress at high speed, the feared pinching of the bearing on the wrist pin since the rod is pulled outwardly toward the junction points.

The four junction points are held to their exact distances by means of the especially provided cross struts.

According to a further feature of this invention, the web between the flanges is so thin that its elasticity under the greatest pressure load is larger than the flexation of the wrist pin positioned in the width of the connecting rod boss.

In cases in which a thin web is provided at all, such web because of its great elasticity avoids the compression pressure so that the wrist pin is in uniform contact across the entire width of the connecting rod. This surface load results in a very small flexation of the wrist pin in contrast to the concentrated load on the connecting web. Consequently, the wrist pin can be made thinner and lighter. Also, piston deformation is reduced. The cap on the crankshaft boss does not need to absorb any more flexation forces because of the given and increased flexation and rigidity of the connecting rod construction and it can therefor be constructed as a smooth tie rod. Thus the entire connecting rod structure is lighter but nevertheless more rigid than a conventional rod. Furthermore, the wrist pin boss can be formed as a smooth tie rod so that the connecting rod shoulder and wrist pin boss have cross-sections dimensioned just so large that during the highest flexation stress that can arise the expansion of the shoulder and/or boss, or tie rods, is not larger than the tension on the bearing members for the crankshaft boss and the wrist pin boss.

A connecting rod has been heretofore known which does not have a construction within the framework of the rod of this invention. On the contrary, only two thin struts are provided between the crankshaft boss which merge tangentially into the wrist pin boss.

Figure 2:
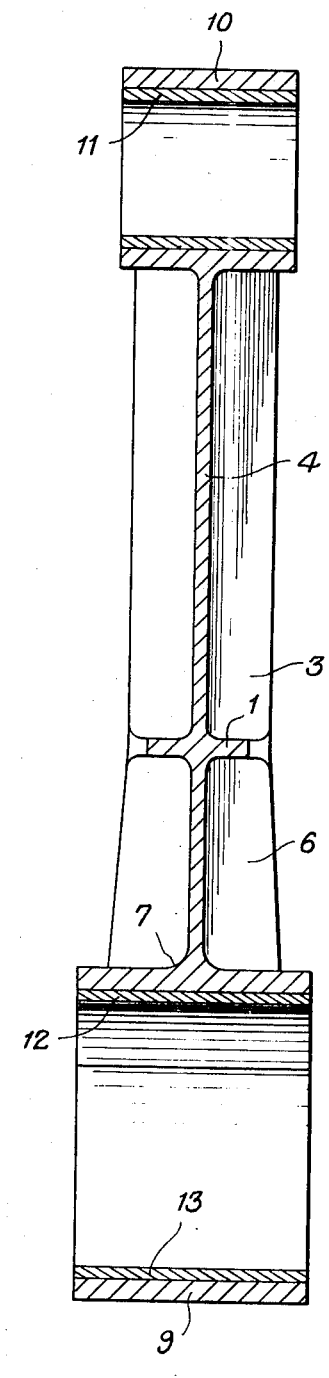

The means by which the objects of this invention are obtained are described more fully with reference to the accompanying drawings in which:

FIG. 1 is a front view of the connecting rod;
FIG. 2 is a cross-sectional view taken on the line 2—2 of FIG. 1; and
FIG. 3 is an enlarged cross-sectional view taken on the line 3—3 of FIG. 1.

The connecting rod has a framework including four junction points a, b, c, d at the ends of the transverse struts 1 and 7 extending between the flanges 2 and 3 and 5 and 6 by means of which the direction of the forces is determined and which eliminate any flexation. Flanges 2 and 3 which extend from the junction points a and b which are nearest the wrist pin boss 10 are perpendicular to the web 4 and tangentially merge into the wrist pin boss 10. This boss contains the bearing 11 for receiving the wrist pin. This construction ensures that the wrist pin boss 10 cannot contract under great compression stresses. The lower end of the connecting rod has two straight flanges 5 and 6 which are connected to the web and diverge and merge into the crankshaft boss which contains the bearing members 12 and 13. The distance between the junction points c and d which are nearest the crankshaft boss is of such a large dimension that during maximum tension stress, for example, at high engine speed, the dangerous pinching of the bearing members 12 and 13 on the crankshaft bearing is avoided. The four junction points a, b, c and d are maintained at an exactly predetermined distance from each other by means of the especially provided cross struts 1 and 7 and which are normal to said web and to said flanges. The web 4 is thinner than either of the struts 1 and 7, and substantially thinner than the width of each of the flanges 2, 3, 5, 6. The forces arising are guided through flanges 2 and 3 and especially the connecting web 4 is made so thin that this web cannot transmit any significant forces and therefor elastically avoids the pressure of the wrist pin and prevents the aforesaid mentioned flexation of the pin because of a concentrated load instead of a more favorable uniform surface load. This makes it possible that the wrist pin can be made thinner and lighter and there is less deformation of the piston itself. The cap 9 on the crankshaft boss also does not need to absorb any more flexation stresses in this construction and therefor it can be constructed as a smooth tie rod. The same is true for the shoulder of the wrist pin boss 10. This results in a lighter weight overall construction together with a more rigid construction than in the conventional connecting rod.

Figure 3:
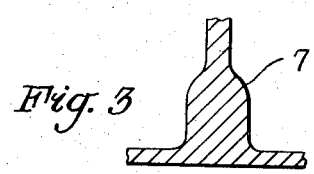

As shown in FIG. 3, the actual cross-section of the struts 7 is that shown on the line 3—3 of FIG. 1.

Having now described the means by which the objects of this invention are obtained,

I claim:

1. A connecting rod for a high power reciprocating piston internal combustion engine comprising a connecting rod web (4) lying in the plane of the movement of the rod, a wrist pin boss on one end of said web, a crankshaft boss on the other end of said web, four flanges (2, 3, 5, 6) on the edges of said web and normal thereto and connecting the wrist pin boss to the crankshaft boss, two of said flanges (2, 3) being tangentially merged into said wrist pin boss, two straight struts (1, 7) normal to said web joined to said flanges and forming four junction points (a, b, c, d) with said flanges, the flanges (2, 3) extending in a straight line between the points (a, b) and the wrist pin boss, and the flanges (5, 6) extending in a straight line between the points (a, b) and the points (c, d) on the crankshaft boss.

2. A rod as in claim 1 in which the distance between the junction points (a, b) is equal to or smaller than the bore through the wrist pin boss (10).

3. A rod as in claim 2 in which the distance between the junction points (c, d) is at least equal to the bore through the crankshaft boss.

4. A rod as in claim 3 in which said web (4) is thinner than said struts (1, 7) and the width of said flanges (2, 3, 5, 6).

References Cited

UNITED STATES PATENTS 3,338,113   8/1967   Camp et al. _____ 74—579

FOREIGN PATENTS 746,785   6/1933   France _____ 74—579
864,172   1/1953   Germany _____ 74—579
981,446   1/1965   England _____ 74—579

FRED C. MATTERN, JR., Primary Examiner

F. D. SHOEMAKER, Assistant Examiner